United States Patent [19]
Foster

[11] 3,854,215
[45] Dec. 17, 1974

[54] MULTIPLANAR SENSOR AND CONTROL SYSTEM FOR USE IN ROLL FORMING MACHINES

[75] Inventor: Gene B. Foster, Seattle, Wash.

[73] Assignee: The Boeing Company, Seattle, Wash.

[22] Filed: July 27, 1973

[21] Appl. No.: 383,374

[52] U.S. Cl. .................................. 33/174 L, 72/9
[51] Int. Cl. ..................... G01b 5/20, G01b 7/28
[58] Field of Search ...... 33/174 P, 174 PA, 174 PC, 33/174 L, 147 L; 72/9, 31, 34

[56] References Cited
UNITED STATES PATENTS

| | | | |
|---|---|---|---|
| 3,352,136 | 11/1967 | Clarke | 72/9 |
| 3,431,761 | 3/1969 | Clement | 72/9 |
| 3,477,134 | 11/1969 | Kuts | 33/174 L |

*Primary Examiner*—Harry N. Haroian
*Attorney, Agent, or Firm*—Christenson, O'Connor, Garrison & Havelka

[57] ABSTRACT

A multiplanar sensing structure and control system therefor suitable for use in a numerically controlled roll forming machine are disclosed. The multiplanar sensing structure includes a support arrangement for mounting a multiplanar sensor in a position such that a work part exiting from contour forming rollers passes through the structure. The support arrangement is formed such that the sensor is free to move in two planes but is prevented from rotating about its longitudinal axis. The multiplanar sensor includes a cylindrical housing having gimballed end plates movable in two orthogonal planes. In addition, the end plates are rotatable and include orifices corresponding to the cross-section of the part being contour formed. As the work part passes through the orifices, the curvature of the part causes the end plates to change position. The change in position of the end plates is sensed by rotary variable-differential transformers (RVDTs). The output from the RVDTs are compared with signals related to the desired curvature of the part and the result of the comparison is used to modify the signals applied to the numerically controlled contour forming machine to provide compensation for part springback.

14 Claims, 8 Drawing Figures

MULTIPLANAR SENSOR AND CONTROL SYSTEM FOR USE IN ROLL FORMING MACHINES

BACKGROUND OF THE INVENTION

This invention is directed to contour forming machines for contour forming sheet metal structural elements and more particularly to apparatus useful in systems for controlling the operation of contour forming machines.

Contour forming machines for forming contours in sheet metal structural elements or parts, such as body frames, stiffeners and stringers used in aircraft, for examples, fall generally into two classes — stretch forming machines and contour rolling machines.

Stretch forming machines cause the parts to yield under tension while being maintained in a plastic state. The parts are wrapped against a form block of the desired contour until the desired part contour is achieved. Because an individual form block is required for each part, stretch forming has the disadvantage of requiring considerable lead time for form block fabrication and testing. With most high-strength materials, springback factors must be experimentally developed and incorporated into the form block contour. In addition to the expense attendant to developing individual form blocks, stretch forming has the further disadvantage of requiring the maintainence and storage of an expensive inventory of large, fairly complex tools. Moreover, stretch forming has the mechanical disadvantage that when a part is formed in tension it has a strong tendency to thin and neck, thus losing structural strength. In order to avoid this tendency, filler blocks and a variety of elongation control devices are frequently employed all of which further increase the cost of contour forming using this process.

In roll forming machines a part is traversed through an arrangement of rolls that are progressively offset to impart increasing contour. The operator of the roll forming machine continues to increase the contour of the part by adjustment of the rolls until he determines through frequent reference to a template or checking fixture that the desired contour configuration has been achieved. Because only a small increment of the part is formed at a time, and because the geometric arrangement of the rolls provide a considerable leverage factor, roll forming facilities are smaller than comparable stretch forming facilities. Moreover, roll forming machines are considerably less expensive than corresponding stretch forming machines. However, classically, only uniplanar contours, as opposed to multiplanar contours, have been formed using roll forming facilities. Moreover, in the past it has been found that parts with complex cross-sections cannot be readily contour formed. Further, manual adjustment of roll positions in accordance with the operators experience is necessary to compensate for varying part springback. Because of these disadvantages, the time required to form a particular part and the resulting part quality depend to a large extent on the skill of the operator. Because operator skill is involved part forming costs rapidly increase with critical tolerance requirements. On the other hand, only minor distortion of the cross-section configuration of a part occurs during roll forming because only a small portion of the part is unsupported at any one time between the forming rolls.

Generally speaking, as can be seen from the foregoing discussion, stretch forming facilities are more suitable for large scale production because they require less operator skill, even though an expensive inventory of fairly complex tooling is required. Roll forming facilities, on the other hand, are better adapted to prototype development and special situations because labor costs are considerably higher due to the high degree of operator skill required.

Recently a numerically controlled contour forming machine has been developed. This machine is described in a Defense Documentation Center (DDC) document entitled "Numerically Controlled Contour Forming" by G. B. Foster. This document is a copy of Interim Technical Report IR-791-0 (I) submitted by the Commercial Airplane Group, The Boeing Company under Air Force contract F 33615-70-C-1827. The document bears the identification number D6-22258. The information contained in this document is incorporated herein by reference for background information purposes. In general, this document describes a control system for controlling the positioning of the right and left forming rolls, which are located on either side of the pinch rolls between which a part to be contour formed passes, of a roll forming machine. The roll forming machine can create complex contours as well as simple (uniplanar) contours in parts with complex as well as simple cross-sectional configurations.

One of the problems with roll forming machines, whether they be manual or electronically controlled, is that springback of the part occurs after it passes through the contour forming rolls, and it is necessary to adjust the rolls to compensate for such springback to obtain the desired contour. The apparatus disclosed in the document referenced above includes a uniplanar sensor for sensing springback in a single plane and using this information to control the positioning of the forming rolls. The document does not, however, disclose a multiplanar sensor for sensing springback even though the apparatus described in the document includes the capability of multiplanar contour forming. This invention is directed to such a multiplanar sensor and a control system for using the information developed by the sensor to control a roll forming machine in order for it to compensate for springback.

Therefore, it is an object of this invention to provide a multiplanar contour sensor.

It is a further object of this invention to provide a multiplanar contour sensor and a control system for modifying the signals applied to a numerically controlled roll forming machine in accordance with information derived by the multiplanar sensor.

It is a still further object of this invention to provide a control system for use with a numerically controlled roll forming machine which includes a sensor for sensing the contour in a multitude of planes of a part being formed by the machine and a means for modifying the signals applied to the forming rolls of the machine in accordance with the information sensed by the multiplanar sensor.

SUMMARY OF THE INVENTION

In accordance with principles of this invention, a multiplanar sensing structure and a control system suitable for use in a numerically controlled roll forming machine is provided by the invention. A multiplanar sensor is mounted in a position such that a part exiting from the contour forming rolls of the roll forming machine passes through the sensor. The multiplanar sensor includes a cylindrical housing and gimballed end plates movable in two orthogonal planes. In addition, the end plates are rotatable and include orifices corresponding to the cross-section of the part being contour formed. As the part passes through the end plates, the contour of the part between the end plates causes the end plates to change position. The change in position is sensed by rotary variable-differential transformers (RVDTs). The output from the RVDTs is compared by the control system of the invention with signals related to the desired contour of the part. The results of the comparison are used to modify the signals controlling the positioning of the rolls of the numerically controlled roll forming machine in a manner such that compensation for part springback is provided.

In accordance with further principles of this invention, the control system includes a memory which stores signal information related to the desired contour of the resultant part. This signal information is applied through a suitable buffer to a manually controllable multiplier which modifies these signals in accordance with the operators experience regarding the amount of springback likely to occur in the part being contour formed. More specifically, a ratio control is manually set by the operator. This setting controls the setting of the manually controllable multiplier. The setting of the ratio control is a rough approximation of the springback likely to occur in the part being contour formed and is determined by the operator's experience with similar parts formed of the same material. In addition, information related to the desired contour is applied to a divider wherein it is compared with contour information derived by the multiplanar sensor. The results of this division comparison are applied to a further or vernier multiplier connected to the output of the rough multiplier to provide a fine or vernier modification of the roughly modified signals. The output of the vernier multiplier is a plurality of corrected command signals. These signals are applied to the numerically controlled roll forming machine to control the positioning of the forming rolls.

In accordance with other principles of this invention a mounting means for mounting the multiplanar sensor a fixed distance from the final forming roll of the roll forming machine is provided. Even though the distance from the final forming roll to the multiplanar sensor is maintained constant, the mounting means is formed such that the sensor is allowed to "float" with respect to the part and, thus, does not apply any distortion creating force to the part.

It will be appreciated from the foregoing brief summary that an apparatus for use in controlling a roll forming machine in a manner such that compensation for springback of a part whose contour is being changed in a complex manner, i.e., in more than one plane, is provided by the invention. A unique multiplanar sensor senses the curvature of the part as it exits from the machine in two planes. In addition, the "twist" of the part is sensed. All of the sensed information is obtained without the multiplanar sensor distorting the part. Even though the sensor is slightly "downstream" from the roll forming machine, because the forming process is relatively slow, this information is available rapidly enough to compensate for springback. The control system used by the invention is relatively uncomplicated in that it merely comprises a comparison arrangement in the form of a divider which compares actual contour signals with desired contour signals and uses the results of the comparison to modify the signals to be applied to the forming rolls of the roll forming machine, said signals having been previously roughly modified. Modification of the signals is also uncomplicated in that command signals are merely ratio multiplied by suitable electronic multipliers to obtain corrected command signals.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein:

FIG. 7 is a pictorial view of a portion of a support assembly suitable for use by the invention; and, FIG. 8 is a block diagram illustrating a control system formed in accordance with the invention for modifying the signals applied to the forming rolls of a numerically controlled roll forming machine to provide compensation for part springback.

DESCRIPTION OF THE PREFERRED EMBODIMENT

Figure 1:
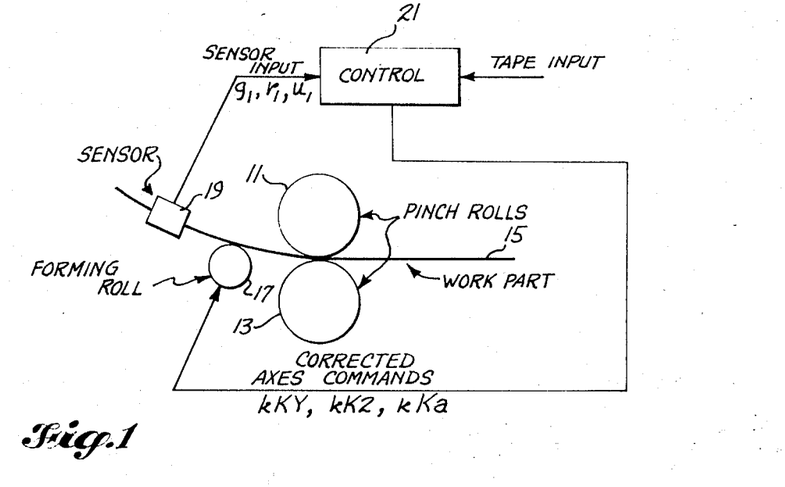
FIG. 1 is a block diagram illustrating the general concept of the invention.

FIG. 1 is a block diagram illustrating a numerically controlled roll forming machine which includes a sensor and control system formed in accordance with the invention. The roll forming machine illustrated in FIG. 1 comprises upper and lower pinch rollers 11 and 13 between which a work part 15 passes. The work part 15 is a longitudinal element formed of a metal such as a titanium alloy and has previously been formed into a general predetermined cross-sectional configuration shape, such as returnflange hat or return-flange Z, for examples. The roll forming machine is designed to contour form such parts by twisting and curving the original "straight" part into a part having a desired contour, as described in the document noted below.

FIG. 1 also illustrates a forming roll 17 located on one side of the pinch rollers 11 and 13, the left side in FIG. 1. While only one forming roll 17 is illustrated, as will be appreciated by those skilled in the art and others, one or more additional forming rolls located on either side of the pinch rollers 11 may be included, if desired. In any event, the work part 15 passes between the pinch rollers 11 and 13 which drive the work part and constrain it against buckling as it is contour formed. The forming roll (or rolls) contour the work part as the work part passes through the roll forming machine. After passing between the pinch rollers and the forming roll or rolls, the work part 15 passes through a sensor 19 formed in accordance with the invention and hereinafter described. The sensor 19 senses the contour of the work part after it has been formed by the forming roll(s) and, thus, generates signals related to actual contour. These signals are designated $q_1$, $r_1$, and $u_1$, as hereinafter defined, and are applied to the control system 21. The control system also receives signals related to the desired contour from a suitable source, such as a pre-coded magnetic or punched tape, for examples. The control system compares the sensor signals with the external (tape) signals and applies corrected axes command signals to the forming roll or rolls 17 which control the positioning of the forming roll or rolls.

It will be appreciated from viewing FIG. 1 and the foregoing description that a roll forming machine contour forms longitudinal metallic components, such as airframe stringers, frames and the like. In such a machine the contour is created by controlling the position of forming rolls about a plurality of axes. If necessary, the work part 15 may be sequentially passed through the contour forming machine several times to create greater and greater contours until a resultant configuration is achieved without unduly stressing the part, if a single pass would unduly stress the part.

Reference is hereby made to the document noted above entitled "Numerically Controlled Contour Forming" by G. B. Foster published by the Defense Documentation Center (DDC) and identified by the number D6-22258 for background purposes. The document is more fully identified as Interim Technical Report IR-791-0 (I), Oct. 1, 1970 — June 30, 1971 Contract F33615-70-C-1827, Project No. 791-0 submitted to the Fabrication Branch, Manufacturing Technology Division, Air Force Materials Laboratory, Air Force Systems Command, Wright-Patterson Air Force Base, Ohio, by the Commercial Airplane Group, The Boeing Company.

One of the problems with contour forming machines is that after a part passes through the forming rolls and exits from the machine, a certain amount of springback occurs. Springback is defined as the tendency of the part to return to the configuration it possessed before it passed through the machine. Because springback occurs and because the amount of springback varies from material to material and from contour to contour, it is not entirely predictable. Because it is not predictable, either the operator must be very skilled in the operation of the machine, or the machine must include means that provides springback compensation. The document identified above discloses a uniplanar sensor for sensing the curvature given to a part exiting from a roll forming machine. This information is utilized by a control system to vary the positioning of the forming rolls to compensate for springback. However, the sensor described in the foregoing document is not suitable for use as part of a forming machine designed to create compound contours because it only senses springback in one plane. This invention, as herein described, provides a multiplanar sensor and a control system for utilizing the information generated by the multiplanar sensor to control the positioning of forming rolls in a roll forming machine adapted to create complex compound contours.

Figure 2:
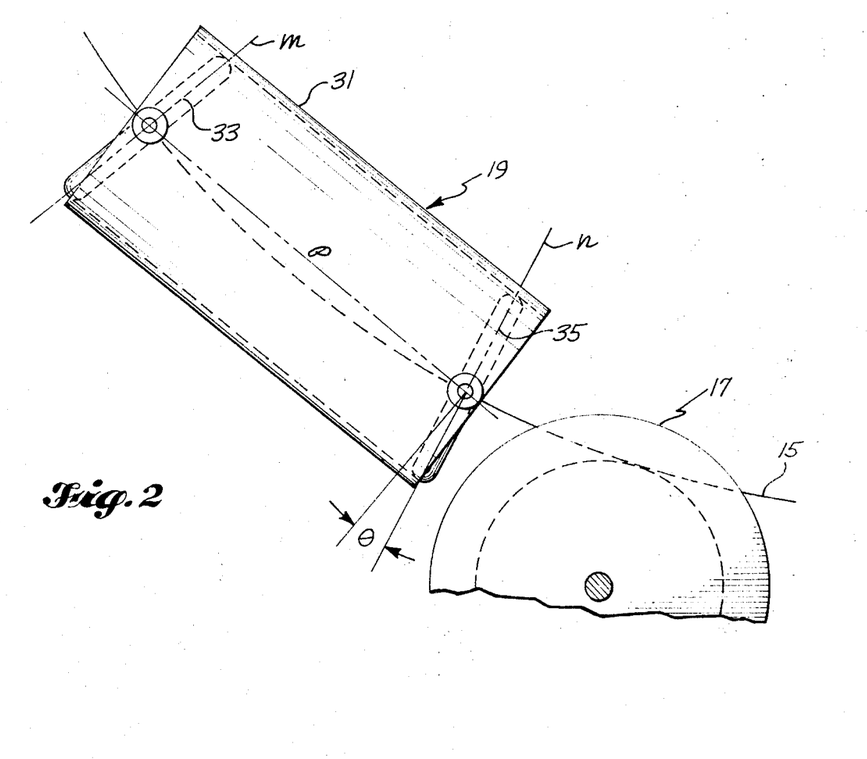
FIG. 2 is a schematic diagram illustrating a multiplanar sensor formed in accordance with the invention.

FIG. 2 is a diagram which illustrates in schematic form a portion of a multiplanar sensor formed in accordance with the invention. Specifically, FIG. 2 illustrates the work 15 as it exits from the last forming roll 17 and passes through the multiplanar sensor 19. The multiplanar sensor 19 includes a cylindrical housing 31 and a pair of end plates 33 and 35. The end plates, as will be better understood from the following description of a preferred embodiment of the invention are angularly movable in two planes and are rotatable. For purposes of simplicity of discussion of the broad concept, however, the end plates illustrated in FIG. 2 are only shown gimballed in one plane. The end plates 33 and 35 further include orifices having a cross-sectional configuration substantially identical to the cross-sectional configuration of the work part 15. As the work part 15 passes through the orifices, it causes the end plates 33 and 35 to move in two orthogonal planes and rotate all in accordance with the contour given to the part by the forming rolls. This information is sensed by suitable sensors and applied to the control system 21 (FIG. 1). By knowing the angular movement of the end plates in two orthogonal planes and the twist or rotation of the end plates, information adequate to define the contour of the part between the end plates is provided. This information, because it is subsequent or downstream from the forming machine, includes springback information.

As will be appreciated from viewing FIG. 2, the gimballed end plates 33 and 35 are separated by a fixed dimension. The end plates are mounted such that, with a straight part in the housing, they lie in two parallel planes with the center of each end plate being coincident with the center line of the part 15. Under this condition the plane of each end plate is orthogonal to the center line of the part. Entrance of a curved part into the multiplanar sensor 19 causes the end plates to angularly move so that the plane of each end plate (lying on axes $m$ and $n$, respectively) are orthogonal to a tangent of the part contour at the center of the end plate. Thus, the angular movement of the end plates measures the central angle subtended by an arc established by intersecting the part contour with a cord ($p$) equal in length to the end plate spacing. The angular rotation ($\theta$) is equal to one-half of the central angle of the arc defined by the contour of the part passing through the multiplanar sensor 19. Thus, contour radius can be determined from the rotation of either end plate by applying the following relationship:

$$R = L/2 \sin \theta$$

where:

$L$ = cord length, inches
$\theta$ = one-half of the central angle, degrees
$R$ = radius, inches As will be better understood from the following description the end plates are movable in two planes orthogonal to one another. These two perpendicular planes are herein defined as the XY and XZ planes. In addition, the twist of the part is determined by sensing the rotation of one of the end plates, even though both are adapted to rotate.

Figures 3, 4:
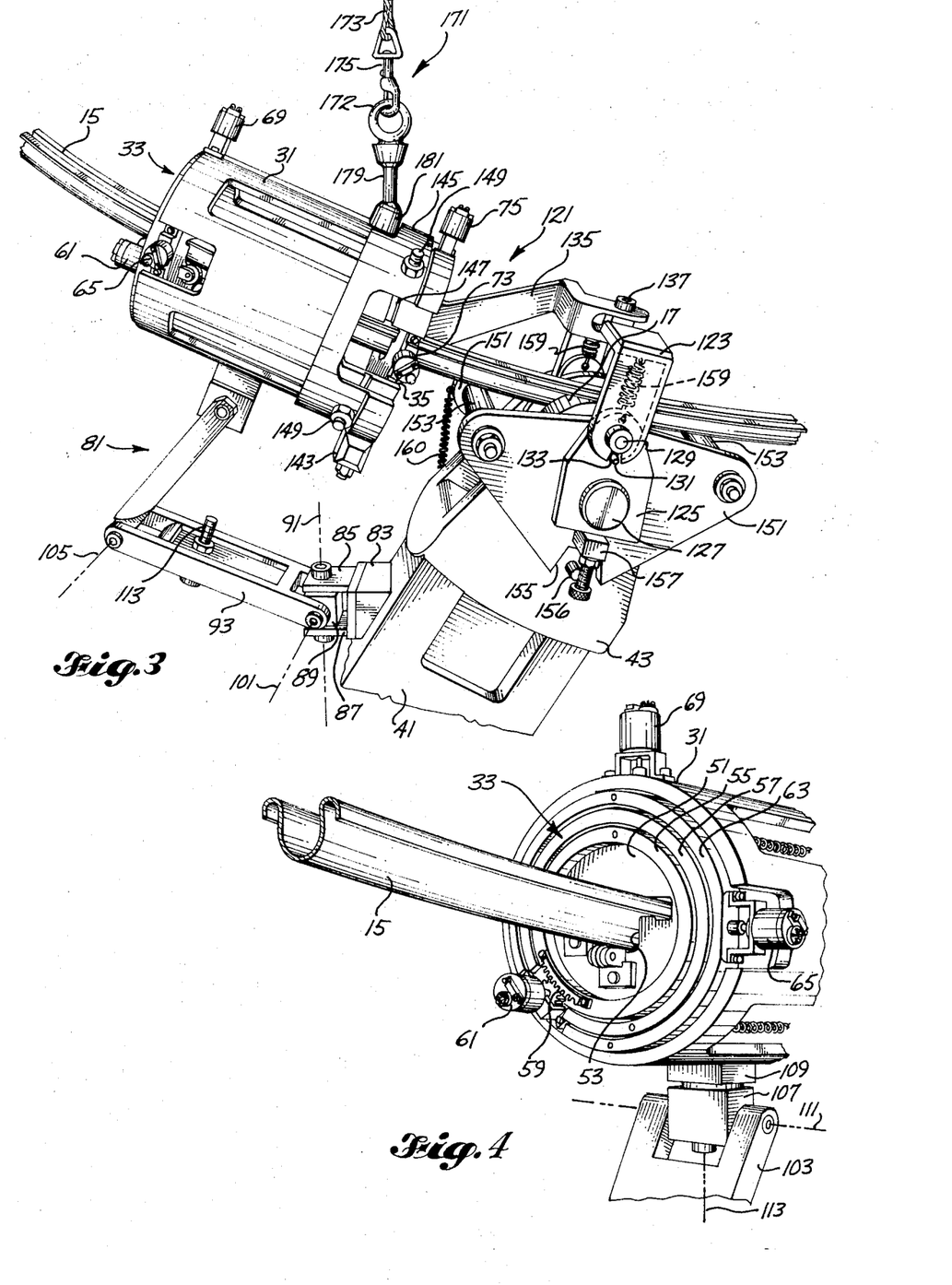
FIG. 3 is a pictorial diagram illustrating a preferred embodiment of a multiplanar sensor formed in accordance with the invention.
FIG. 4 is a pictorial diagram illustrating, from a different angle, a portion of the multiplanar sensor illustrated in FIG. 3.

FIG. 3 is a pictorial diagram of a preferred embodiment of a multiplanar sensor formed in accordance with the invention. FIG. 3 illustrates a fixed support 41 supporting a movable yoke 43 which supports the final forming roll 17 in a rotatable manner. More specifically, the movable yoke 43 is movable with respect to the fixed support 41 in a plurality of directions so as to be able to place the forming roll 17 in any desired position. In this regard, reference is hereby made to the document referred to above entitled "Numerically Controlled Contour Forming" by G. B. Foster for background information regarding the directional movement and positioning of the forming rolls of a roll forming machine.

The cylindrical housing 31 is preferably formed of aluminum and supports the two gimballed end plates 33 and 35. The "downstream" or leftmost (FIG. 3) end plate 33 is best illustrated in FIG. 4 and comprises an insert 51, preferably formed of nylon, that includes an orifice 53 having a cross-sectional configuration similar to the cross-sectional configuration of the part 15 being contour formed. In the case of FIG. 4, the cross-sectional configuration is return-flange hat, as will be understood by those skilled in the art. The insert 51 is surrounded by a first ring 55 which is rotatably mounted in a center ring 57 by suitable rollers or bearings (not shown). Thus, as the part 15 passes through the orifice 53 in the insert, any twist in the part causes the inner ring 55 to rotate with respect to the center ring 57. This rotation is transferred through a spur gear and ring gear segment 59 to the sensing member of a rotary variable-differential transformer (RVDT) 61, causing the sensing member to rotate. Rotation of the sensing member of the RVDT 61 varies the value of an electrical voltage applied to the coil of the RVDT. Thus, the electric voltage variation is related to the position of the insert 51, which in turn is related to the amount of part twist, assuming the cylindrical housing is not allowed to rotate. A means designed to prevent such rotation is hereinafter described.

The center ring 57 is surrounded by an outer ring 63 and is pinned thereto by any suitable means at two points located along a diameter that, preferably, lies in a horizontal plane. In any event, the two points of attachment lie along the axis defined by the sensing member of a second RVDT 65 mounted on the outer ring 63. The manner of pinning is such that the center ring is free to rotate about the diameter defined by the pins and with respect to the outer ring 63. Because of this manner of attachment, when the part 15 moves through the multiplanar sensor, if it has a curvature in the XY plane (defined as the plane orthogonal to the diameter defined by the pinning points), the center ring 57 swivels or moves around the pinning points connecting it to the outer ring 63. This angular movement causes the sensing element of the second RVDT 65 (which is affixed to the center ring) to rotate, causing the output of the second RVDT to vary a suitable electric voltage. In this manner, the curvature of the part in the XY plane is sensed by the second RVDT 65.

The third or outer ring 63 is surrounded by the end of the housing 31 and is pinned thereto at two points, both of which lie along a diameter that, preferably, lies in a vertical plane and, thus, is orthogonal to the plane in which the two points attaching the center ring to the outer ring lie. In any event, the two points lie along an axis defined by the sensing member of a third RVDT 69 mounted on the housing 31. Because of this manner of attachment, if the part 15 is contoured in the XZ plane (defined as the plane orthogonal to the diameter defined by these pinning points) the sensing member of the third RVDT 69 (which is affixed to the third ring) rotates, causing a suitable electrical voltage applied to the coil of the third RVDT to vary.

The end plate on the other (upstream) end of the multiplanar sensor is formed in a similar fashion and includes a fourth RVDT 73 adapted to sense part contour in the XY plane and a fifth RVDT 75 adapted to sense part contour in the XZ plane. However, an RVDT adapted to sense insert rotation is not included, even though one could be included, if desired. A "rotation" sensing RVDT at the upstream end is not needed because as long as the housing is prevented from rotating only the twist at one end of the overall structure need be sensed. Even though an RVDT for sensing twist at the upstream end is not included, the upstream insert must be free to rotate in its associated inner ring.

The housing 31 is prevented from rotating while being free to move up and down and to the right and left (as viewed in FIG. 3) by an antirotation linkage 81. The antirotation linkage 81 includes a block 83 affixed to the fixed support 41. A U-shaped bracelet having upper and lower arms 85 and 87 that project outwardly from the block is attached to the block. A block 89 is rotatably attached to the arms 85 and 87 so as to be movable about an essentially vertical axis 91. Extending outwardly from the rotatable block 89 is a lower coupling arm 93. The lower coupling arm 93 is rotatably attached to the rotable block 89 so as to be movably about an axis 101 orthogonal to the axis of movement 91 of the rotatable block 89. Rotatably attached to the outer end of the lower coupling arm 93 is an upper coupling arm 103. The upper coupling arm is rotatable about an axis 105 which is parallel to the axis 101. The upper coupling arm 103, as best illustrated in FIG. 4, is rotatably attached to a second rotatable block 107, which in turn is rotatably attached to a block 109 affixed to the cylindrical housing 31. The upper coupling arm 103 is rotatably attached to the second rotatable block 107 so as to be movable about axis 111 parallel to axis 105. The second rotatable block 107 is rotatably attached to the fixed block 109 so as to be movable about an axis 113 orthogonal to axis 111. While the upper coupling arm 103 is free to move downwardly, its downward movement is limited by a stop bolt 113 projecting upwardly from the lower coupling arm 93.

It will be appreciated from the foregoing description and viewing the antirotation linkage 81 illustrated in the drawings that while the cylindrical housing 31 is free to move up and down and back and forth, it is not free to rotate.

Even if the cylindrical housing 31 is formed of aluminum, its weight and that of its associated elements is greater than the weight supportable by the antirotation linkage 81. Thus, other weight supporting means is provided by the invention. One such support means is a support assembly 121 which, in addition to providing support, also performs a tangent point locating function.

The support assembly 121 comprises a U-shaped bisector arm 123. The arms of the bisector arm project generally downwardly and are attached to a pair of plates 125, one lying on either side of the forming roll 17. The plates 125 are rotatably attached to the same shaft as that which the forming roll 17 is attached. The U-shaped bisector arm 123 is affixed to the plates 125 by suitable bolts 129 and prevented from rotating exesssively with respect to the plates when a work part is not in the apparatus by pins 131 that are affixed to the plates and lie in slots 133 formed in the ends of the arms of the bisector arm 123. Thus, when the plates 125 rotate about the shaft 127, as hereinafter described, the bisector arm 123 moves in an arc about the axis of the shaft 127.

Figure 7:
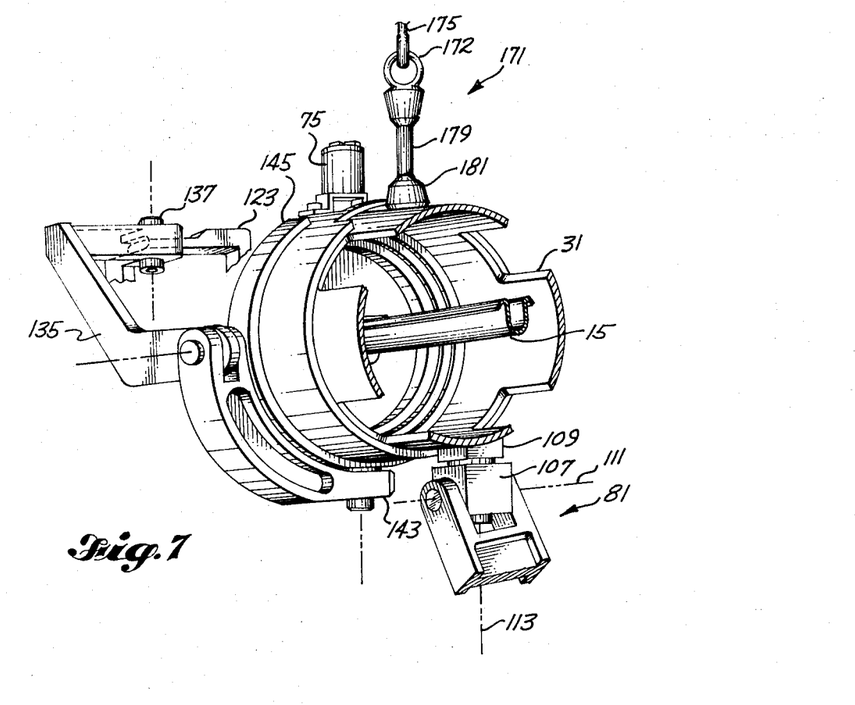

A "straightened" Z-shaped support arm 135 projects outwardly from the center of the bisector arm 123 and is rotatably attached thereto by a suitable attachment means 137, such as a bolt, for example. After projecting outwardly for a short distance toward the multiplanar sensor, the Z-shaped support arm 135 bends at right angles toward one side of the sensor. Thereafter, the Z-shaped support arm 135 bends at right angles toward the multiplanar sensor, so that its outer end lies along the side of the sensor. The arm 135 ends at a rotatable connecting point 139 (FIG. 7), where it is connected to a C-shaped element 143. This axis of rotation generally lies in a horizontal plane. The C-shaped element is rotatably attached to a cylindrical collar 145 surrounding the upstream end of the cylindrical housing 31. The rotatable attachment is at the base of the collar 145 and allows movement about an axis defined by a diameter of the collar. The collar 145 is concentrically movable about the housing 31. That is, the collar is free to rotate about the housing 31, the housing being prevented from rotating by the antirotation linkage 81 heretofor described. However, the collar 145 is prevented from "slipping" in a longitudinal direction along the housing 31 by a slot 147 formed in the housing 31 that coacts with a plurality of bolts 149 attached to the collar 145. The bolts have heads (not shown) that slide in the slot 147.

Figures 5, 6:
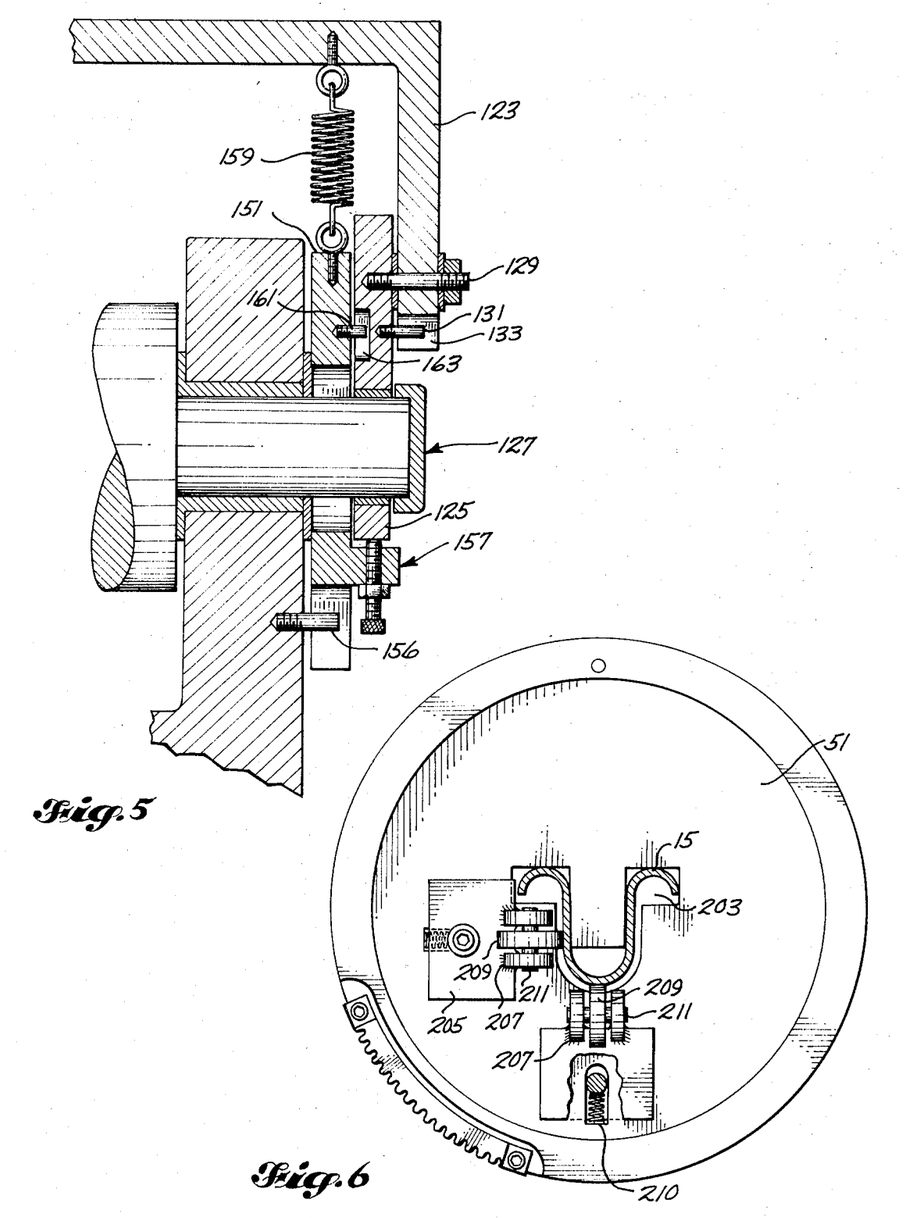
FIG. 5 is a cross-sectional view of a portion of the multiplanar sensor illustrated in FIG. 3.
FIG. 6 is a front view of an end plate suitable for use by the invention.

In addition to providing sensor support, the support assembly 121 also functions to maintain the downstream end of the multiplanar sensor a fixed distance from a tangential point on the surface of the forming roll 17. It does so without inhibiting the freedom of movement of the multiplanar sensor. Tangential positioning is achieved even though the curvature of part 15 varies by a pair of "floating" wing plates 151 and coupling rollers 153. More specifically, a floating wing plate 151 is located on either side of the forming roll 17, inboard of the plates 125. The coupling rollers 153 join the floating wing plates at the outer tips thereof and impinge on the lower surface of the work part 15. The floating wing plates include slots 155 located about the shaft 127. The slots allow the floating wing plates to move upwardly in reponse to forces applied by springs 159 attaching the wing plates to the bisector arm 123. Attached to the floating wing plates 151 are stop mechanisms 157. The stop mechanisms include bolts which impinge on the plates 125 and, thus, prevent the wing plates from moving upwardly beyond a predetermined level. In addition, as best seen in FIG. 5, a pin 161 is affixed to each floating wing plate 151 and rides in a generally vertical slot 163 formed in the associated plate 125. This manner of connection allows the wing plates to "float" upwardly without applying a force to the plates. However, any rotation of the wing plates causes the plates 125 to rotate with respect to the shaft 127. This rotation is transferred to the sensor via the bisector arm 123 and the support arm 135. Thus, the springs 159 maintain the rollers 153 in contact with the work piece 15, and the pin-slot connection causes the bisector arm 123 to rotate through an arcuate distance equal to any arcuate rotation of the wings 151 created by the curvature of the work piece 15. Further coil springs 160 (one on either side) are provided to maintain the wing plates and rollers horizontal when a work part is not in the illustrated apparatus. This manner of tangential positioning maintains the fixed distance between the multiplanar sensor and the point of tangency between the work piece 15 and the forming roll 17. In this regard, it should be noted that the center line of the bolts 129 affixing the bisector arm 123 to the plates 125 lies on a line defined by the points of tangency between the work part 15 and the forming roll 17. The wing plates are prevented from rotating excessively when a work part is not in the apparatus by a pin 156 which is affixed to the movable yoke 43 and lies in the slot 155.

It will be appreciated at this point that the collar 145 of the support assembly 121 is free to rotate about the housing 31, the housing being prevented from rotation about its longitudinal axis by the antirotation linkage 81. Yet, even though movement is allowed, the support assembly provides support for the sensor structure. In addition, in order to provide even further support to prevent the sensor from distorting the part 15 a counterbalance 171 is provided. The counterbalance 171 comprises a vertical chain or cable 173 afixed at its upper end. The chain or cable 173 is attached at its lower end by a hook 175 to a ring 177. The ring is fixedly attached to (or integrally formed with) a shaft 179 which is coupled by a universal coupling 181 to the housing 31. The universal coupling 181 is a ball joint coupling where the ball is formed on the end of the shaft 179 and a suitable ball accepting housing is afixed to (or formed as part of) the housing 31. The counterbalance 171 further supports the weight of the sensor and, thus, aids in preventing the sensor structure from elastically deforming the work part 15.

As previously indicated, the work part 15 passes through orifices formed in the end plates of the multiplanar sensor. Each end plate supports a pair of miniature roll carriages mounted so that they can move in radial directions only at right angles to one another. FIG. 6 illustrates one side of one end plate and this roller arrangement. Specifically, a first carriage support 201 is attached to the insert 51 beneath (as viewed in FIG. 6) the orifice 203 through which the part 15 passes. Orthogonally located with respect to the first carriage support 201 is a second carriage support 205. Projecting outwardly toward the orifice 203 from the supports 201 and 205 are carriages 207. The carriages 207 include two arms that extend outwardly from either side of the insert. Supported between the arms on either side of the insert and at equal distances therefrom are miniature wheels 209 mounted on shafts 211. Thus, there are four wheels associated with each end plate. The carriages 207 are pressed upwardly by springs 210. The springs, carriages and wheels, thus, press the part 15 upwardly and to the right, as viewed in FIG. 6. This manner of holding the part maintains it in a fixed position in the orifice 203 against top and right side insert indexing lands. By virtue of their relatively wide span of contact, the wheels 209 orient the insert 51 with respect to the part much more accurately than would be the case if only the narrow indexing lands formed by an orifice were used.

It will be appreciated from the description thus far that a multiplanar sensor suitable for sensing curvature in two planes and twist of a part formed by a contour forming machine is provided by the invention. The information generated by the RVDTs can be utilized in a variety of ways. For example, only the upstream XY and XZ contour RVDTs can be utilized in combination with the downstream twist RVDT. In this case the downstream XY and XZ contour RVDTs are not used at all. Alternatively, both upstream and downstream XY and XZ contour RVDTs can be utilized to sense angular contour, their total being summed and divided by two to provide an average value. The advantage of using a single RVDT in both contour planes is increased sensitivity which is important when part contour is rapidly changing. On the other hand, two RVDT values in a single contour plane provides a more stable output and, thus, eliminates system oscillation. In any event, it will be appreciated that the multiplanar sensor provides information regarding curvature in two orthogonal planes, plus twist information. The information not only relates to the curvature created by the contour forming machine but also the amount of springback that occurs after the part exits from the machine. Thus springback information is part of the sensor information. As previously indicated the sensor information is utilized by the invention to create modified or corrected control or command signals for controlling the contour forming machine. A control system for creating such corrected command signals is illustrated in block form in FIG. 8.

Figure 8:
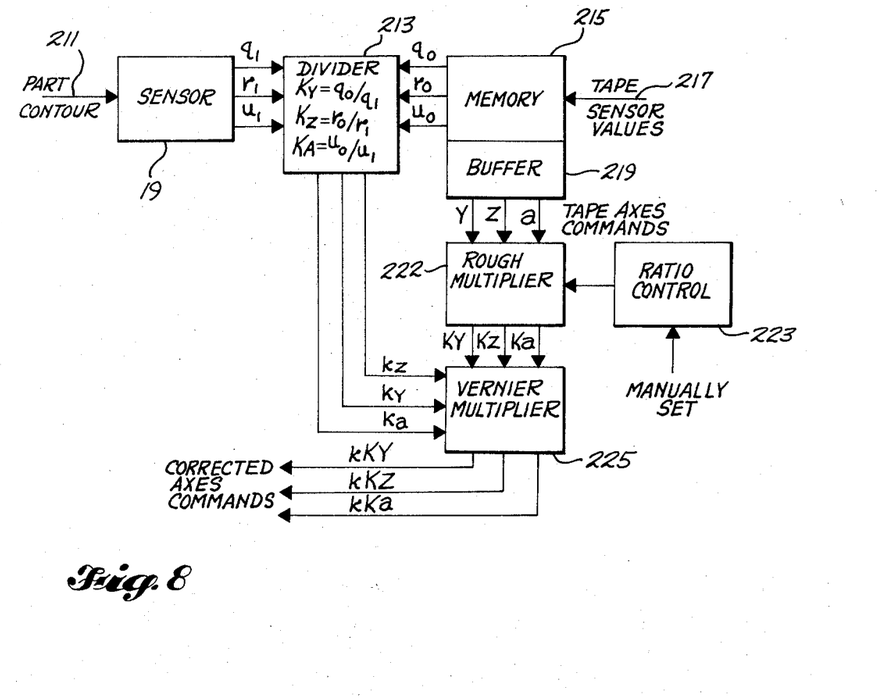

The control system illustrated in FIG. 8 comprises the sensor 19 which receives part contour information, illustrated by the arrow 211, in the manner previously described. The outputs from the sensor, designated $q_1$, $r_1$, and $u_1$, are related to XY plane, XZ plane, and twist, respectively. This $9_1$, $r_1$, and $u_1$ information is applied to a divider 213 which is adapted to electronically compare the sensed information signals with information signals related to the desired contour in the two sensing planes and the desired twist. This latter information is derived from a memory 215 and is identified as $q_o$, $r_o$, and $u_o$ (related to XY plane, XZ plane and twist, respectively). The information contained in the memory 215 is obtained from a reader (not shown) reading a suitable tape or other source of contour desired signals, identified by the arrow 217. The memory 215 also obtains and stores axes commands. The axes commands are identified as Y, Z and a and are applied by a buffer 219, which may modify or delay the information, as necessary, to a rough multiplier 222. The rough multiplier 222 is adapted to modify the axes commands in accordance with a predicted amount of springback. The predicted amount of springback is applied to the rough multiplier by a ratio control 223 which is manually set by the operator of the overall roll forming machine. In other words, the operator manually sets the ratio control 223 in accordance with his experience regarding the amount of springback likely to occur in the part being contoured taking into consideration the amount of contour, the cross-sectional shape of the part and the material composition of the part. The rough multiplier 222 multiplies axes compounds Y, Z, and a in accordance with the operators adjustment of the ratio control and applies the thusly modified axes commands to a vernier multiplier 225. The modified axes commands are identified in FIG. 8 as KY, KZ and K$a$ (related to XY plane, XZ plane and twist, respectively). The vernier multiplier also receives vernier modification signals from the divider 213. The vernier modification signals result from dividing the sensor contour signals into the desired contour signals received from the memory. If these signals are the same, obviously, "ones" are applied to the vernier multiplier and it does not modify its input signals. On the other hand, if any of the signals are different, a modification signal greater or less than one is generated. The signals applied to the vernier multiplier by the divider are identified as $k_Z$, $k_Y$, $k_a$.

In accordance with the value of these signals, the axes commands are further modified by the vernier multiplier. The outputs from the vernier multiplier are identified as $k$KY, $k$KZ, $k$K$a$ and are corrected axes commands. The corrected axes commands are used by the roll forming machine to control the positioning of its contour forming rolls. The feedback arrangement of the invention, thus, provides signal to the roll forming machine that control the positioning of the forming rolls in a manner such that compensation for springback is provided. If desired, range control can be incorporated into the invention. In addition, certain limiting parameters can be incorporated, if desired.

It will be appreciated from the foregoing description that the invention provides a multiplanar sensor for sensing the planar and twist contours applied to a longitudinal element (part) being contour formed. The element may be a stringer or frame member for an aircraft, for example. The multiplanar sensor of the invention provides information which is utilized through a control mechanism to control the positioning of the forming rolls of a roll forming machine in a manner such that compensation for the springback, which occurs when the element being contour formed leaves the roll forming machine, is provided.

While a preferred embodiment of the invention has been illustrated and described, it will be appreciated by those skilled in the art and others that various changes can be made therein without departing from the spirit and scope of the invention. Hence, the invention can be practiced otherwise than as specifically described herein.

The embodiments of the invention in which an exclusive property or privilege is claimed are defined as follows:

1. A multiplanar sensor suitable for use with a roll forming machine comprising:
   a housing having a longitudinal axis;
   an end plate mounted in said housing so as to be freely movable in at least one plane, said end plate including an orifice;
   a first sensor mounted so as to sense the movement of said end plate in said at least one plane; and,
   mounting means for mounting said housing with respect to said roll forming machine in a manner such that a part exiting from said roll forming machine passes through said housing and said orifice so as to vary the position of said end plate in accordance with the curvature of the part.

2. A multiplanar sensor as claimed in claim 1, wherein said end plate is movable in two planes, said first sensor sensing the movement of said end plate in one of said two planes, and including a second sensor mounted so as to sense the movement of said end plate in the second of said two planes.

3. A multiplanar sensor as claimed in claim 2, including a second end plate movable in two planes, a third sensor mounted so as to sense the movement of said second end plate in one of said two planes, and a fourth sensor mounted so as to sense the movement of said second end plate in the other of said two planes.

4. A multiplanar sensor as claimed in claim 3, wherein both of said end plates are rotatable and including a fifth sensor mounted so as to sense the rotation of one of said end plates.

5. A multiplanar sensor as claimed in claim 4, wherein said sensors are rotary variable differential transformers.

6. A multiplanar sensor as claimed in claim 4, wherein each of said end plates comprises:
an outer ring rotatably mounted in said housing in a manner such that the plane of said ring is movable, said movement being sensed by the associated first and third sensors;
a center ring rotatably mounted in said outer ring so that the plane of said center ring rotates through a plane orthogonal to the plane of rotation of said outer ring, said movement of said center ring being sensed by the associated second and fourth sensors;
an inner ring rotatably mounted in said center ring, said rotatable movement of the inner ring of one of said end plates being sensed by said fifth sensor; and
an insert mounted in said inner ring, said insert including said orifice.

7. A multiplanar sensor as claimed in claim 6, wherein said sensors are rotary variable differential transformers.

8. A multiplanar sensor as claimed in claim 6, wherein the peripheral outline of said orifice is generally similar to the peripheral outline of said part.

9. A multiplanar sensor as claimed in claim 8, wherein said orifice includes lands and wherein said end plates include means for pressing said part against said lands.

10. A multiplanar sensor as claimed in claim 9, wherein said sensors are rotary variable differential transformers.

11. The improvement claimed in claim 10, wherein said multiplanar sensor includes mounting means for mounting said multiplanar sensor a predetermined tangential distance from the final forming roll of said roll forming machine.

12. A multiplanar sensor as claimed in claim 11, wherein said mounting means includes an antirotation linkage for preventing said housing from rotating and a support assembly attached so as to support said housing a predetermined distance from the final forming roll of said roll forming machine.

13. A multiplanar sensor as claimed in claim 12, including a counterbalance means for supporting said housing.

14. A multiplanar sensor as claimed in claim 13, wherein said support assembly includes means for maintaining said housing a predetermined distance from the tangential point wherein said part meets said final forming roll.

* * * * *